(12) United States Patent
Osman

(10) Patent No.: US 11,368,117 B2
(45) Date of Patent: Jun. 21, 2022

(54) SYSTEM AND METHOD FOR CONTROLLING A LINEAR MOTOR HAVING MULTIPLE SECTIONS WITH A SINGLE VARIABLE FREQUENCY DRIVE

(71) Applicant: SIEMENS AKTIENGESELLSCHAFT, Munich (DE)

(72) Inventor: Richard H. Osman, Pittsburgh, PA (US)

(73) Assignee: Siemens Aktiengesellschaft, Munich (DE)

( * ) Notice: Subject to any disclaimer, the term of this patent is extended or adjusted under 35 U.S.C. 154(b) by 984 days.

(21) Appl. No.: 16/070,685

(22) PCT Filed: Feb. 27, 2017

(86) PCT No.: PCT/US2017/019569
§ 371 (c)(1),
(2) Date: Jul. 17, 2018

(87) PCT Pub. No.: WO2017/151451
PCT Pub. Date: Sep. 8, 2017

(65) Prior Publication Data
US 2021/0067067 A1    Mar. 4, 2021

Related U.S. Application Data

(60) Provisional application No. 62/301,192, filed on Feb. 29, 2016.

(51) Int. Cl.
*H02P 25/06* (2016.01)
*H02P 6/00* (2016.01)

(52) U.S. Cl.
CPC .............. *H02P 25/06* (2013.01); *H02P 6/006* (2013.01)

(58) Field of Classification Search
CPC ................ H02P 25/06; H02P 6/006
(Continued)

(56) References Cited

U.S. PATENT DOCUMENTS

| | | | | |
|---|---|---|---|---|
| 5,136,217 A | * | 8/1992 | Hoffmann | B60L 15/005 318/135 |
| 6,531,801 B1 | * | 3/2003 | Blazek | D06F 37/304 310/261.1 |

(Continued)

FOREIGN PATENT DOCUMENTS

| | | |
|---|---|---|
| CN | 101036287 A | 12/2007 |
| CN | 105169706 A | 12/2015 |

(Continued)

OTHER PUBLICATIONS

Rodriguez J et al: "Multilevel Converters: An Enabling Technology for High-Power Applications", Proceedings of the IEEE, IEEE. New York, US, vol. 97, No. 11, pp. 1786-1817, XP011278598, ISSN: 0018-9219, DOI: 10.1109/JPROC.2009.2030235, paragraph VI.A, paragraph IV.B.

(Continued)

*Primary Examiner* — David Luo

(57) ABSTRACT

A system (500) for controlling a linear alternating current (AC) electrodynamic machine (400) includes a linear AC electrodynamic machine (400) with a stationary part (410) with a plurality of discrete stationary sections (412, 414, 416), each stationary section (412, 414, 416) having a poly-phase circuit; a variable frequency drive (VFD) (510) configured to be coupled to a utility power source and to provide output currents, wherein the VFD (510) is operable coupled to the stationary part (410) of the linear AC electrodynamic machine (400) for powering and controlling the stationary sections (412, 414, 416) of the stationary part (410); and a plurality of switches (512, 514, 516) coupled between the VFD (510) and the stationary part (410), (Continued)

wherein the plurality of switches (512, 514, 516) allow connecting or disconnecting the VFD (510) to or from the stationary sections (412, 414, 416).

11 Claims, 2 Drawing Sheets

(58) Field of Classification Search
USPC .................................................. 318/135, 34
See application file for complete search history.

(56) References Cited

U.S. PATENT DOCUMENTS

| | | | |
|---|---|---|---|
| 6,814,216 B2* | 11/2004 | Veit | B65G 47/844 198/370.02 |
| 7,245,093 B2* | 7/2007 | Engel | B60L 13/03 318/135 |

FOREIGN PATENT DOCUMENTS

| | | |
|---|---|---|
| DE | 102005024309 A1 | 11/2006 |
| EP | 0456239 A1 | 11/1991 |
| JP | 2004159385 A | 6/2004 |

OTHER PUBLICATIONS

Henning U et al: "The Static Frequency Converter of the Transrapid Propulsion System-Development and Test Results", EPE '97. 7th European Conference On Power Electronics and Applications. Trondheim, Sep. 8-10, 1997; [EPE . European Conference On Power Electronics and Applications.)

PCT International Search Report and Written Opinion of International Searching Authority dated Jun. 16, 2017 corresponding to PCT International Application No. PCT/US2017/019569 filed Feb. 27, 2017.

* cited by examiner

SYSTEM AND METHOD FOR CONTROLLING A LINEAR MOTOR HAVING MULTIPLE SECTIONS WITH A SINGLE VARIABLE FREQUENCY DRIVE

CROSS REFERENCE TO RELATED APPLICATIONS

This Application is the U.S. National Stage of International Application No. PCT/US2017/019569 filed 27 Feb. 2017 and claims benefit thereof, the entire content of which is hereby incorporated herein by reference. The International Application No. PCT/US2017/019569 claims priority to U.S. Provisional Application No. 62/301,192 filed 29 Feb. 2016, the entire content of which is hereby incorporated herein by reference.

BACKGROUND

1. Field

Aspects of the present invention generally relate to electrodynamic machines, which include for example electric motors, such as alternating current (AC) motors, and more particularly to a system and method for controlling a linear motor having multiple sections with a variable frequency drive (VFD).

2. Description of the Related Art

Linear electrodynamic machines comprise a stationary part and a moving part, wherein a linear force is produced along a length of the motor such that the moving part is moving in a linear direction along the stationary part. In a poly-phase linear motor, the stationary part consists of multiple coils arranged longitudinally in a poly-phase circuit. The moving part can include magnets, such as permanent magnets, arrayed side by side, with alternating N and S poles along its traveling direction.

Linear motors may be started and/or controlled using a variable frequency drive (VFD) which is operably coupled to the linear motor, in particular to the part that comprises the coil units. A VFD may controllably increase the magnitude and frequency of voltage applied to the motor during start-up. The voltage magnitude and frequency may start at very low values and may then increase to the rated voltage of the motor and/or to the frequency of the utility power source. Further, the VFD may comprise a control system including a control circuit in order to provide a precision speed control of the linear motor.

In a linear motor, the moving part is typically shorter than the stationary part since the moving part moves along the stationary part. When the stationary part comprises the coils, and the linear motor is powered and controlled by a VFD, the length of the stationary part should not be made too long, because most of the coils are not coupled to the moving part, and the uncoupled coils create a leakage flux which the VFD has to contend with by applying more voltage than would be necessary to drive only the coils coupled to the moving part of the motor. This phenomenon results in a poor utilization of the VFD as it must be rated for more voltage, which provides no contribution to the power delivered to the moving part.

SUMMARY

Briefly described, aspects of the present invention generally relate to electrodynamic machines, which include for example electric motors, such as alternating current (AC) motors, and more particularly to a system and method for controlling a linear motor having multiple sections with a variable frequency drive (VFD).

A first aspect of the present invention provides a system for controlling a linear alternating current (AC) electrodynamic machine comprising a linear AC electrodynamic machine comprising a stationary part with a plurality of discrete stationary sections, each stationary section comprising a poly-phase circuit; a variable frequency drive (VFD) configured to be coupled at an input to a utility power source and to provide output currents, wherein an output of the VFD is operable coupled to the stationary part of the linear AC electrodynamic machine for powering and controlling the stationary sections of the stationary part; and a plurality of switches coupled between the VFD and the stationary part, wherein the plurality of switches allow connecting or disconnecting the VFD to or from the stationary sections.

A second aspect of the present invention provides a method for controlling a linear alternating current (AC) electrodynamic machine comprising sequentially powering a plurality of discrete stationary sections of a linear AC electrodynamic machine via a plurality of switches using a single variable frequency drive (VFD).

DETAILED DESCRIPTION

Reference will now be made in detail to the example embodiments of this disclosure, which are illustrated in the accompanying drawings. Wherever possible, the same reference numbers will be used throughout the drawings to refer to the same or like parts.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
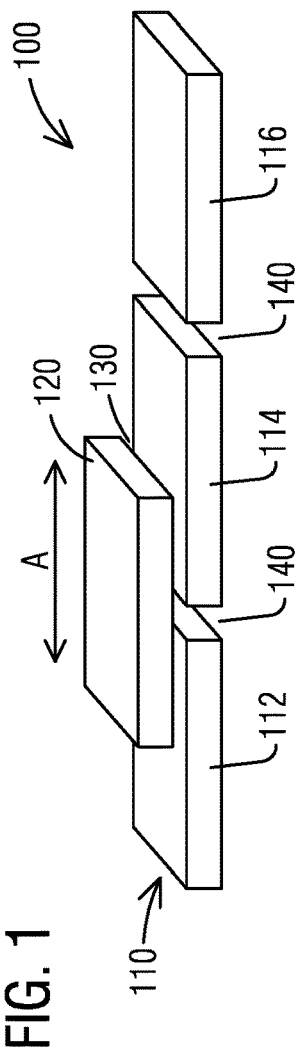
FIG. 1 illustrates a 3-dimensional schematic diagram of a known linear alternating current (AC) motor in accordance with embodiments disclosed herein.

FIG. 1 illustrates a 3-dimensional schematic diagram of a known linear alternating current (AC) motor 100 in accordance with embodiments disclosed herein. The linear AC motor, herein also referred to as simply linear motor 100, comprises a stationary part 110 and a moving part 120, separated by an air gap 130, wherein a linear force is produced along a length of the linear motor 100, which is the traveling direction A of the moving part 120.

Figure 2:
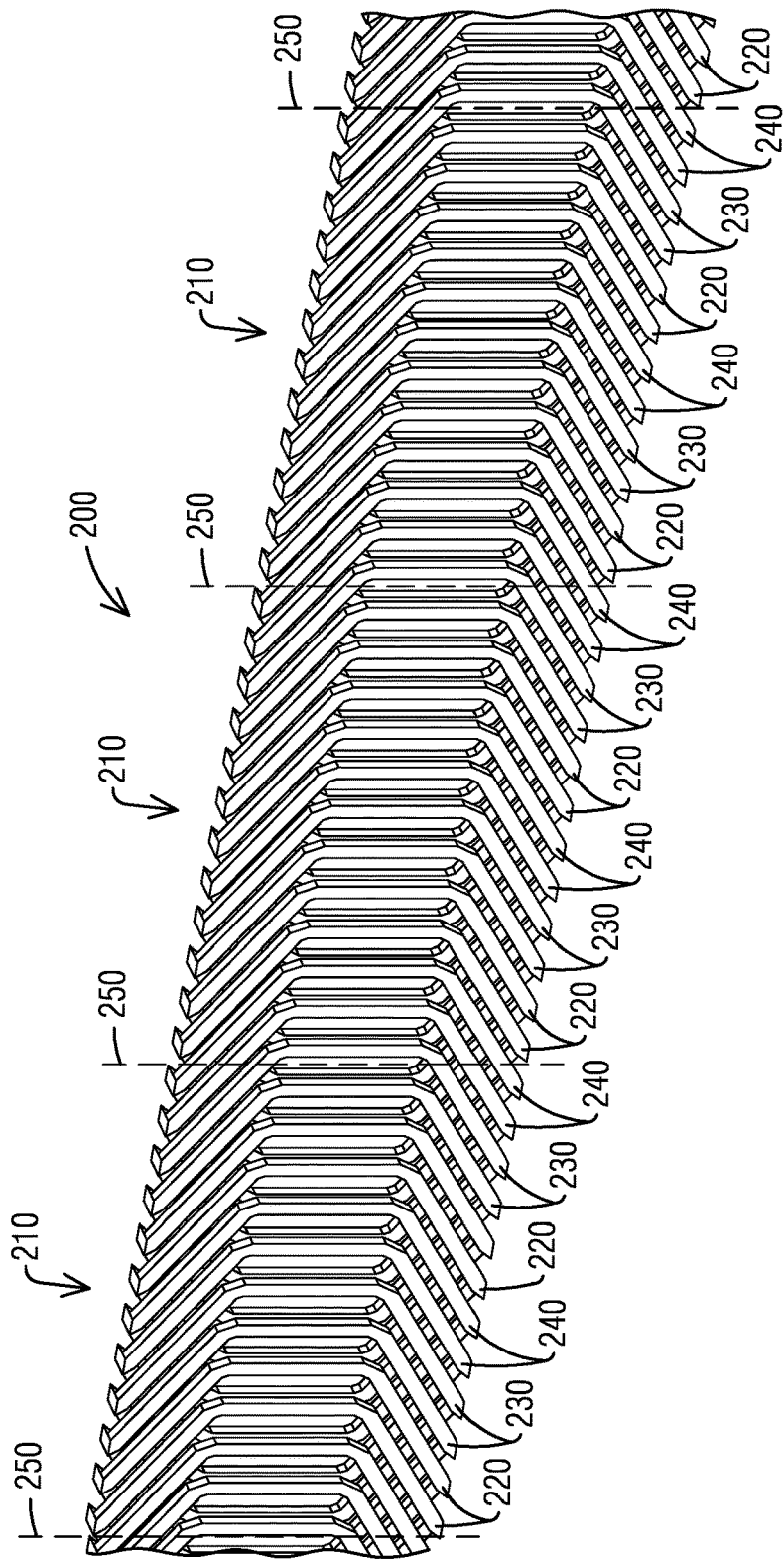
FIG. 2 illustrates a 3-dimensional schematic diagram of a portion of a stationary section of a stationary part of a linear AC motor in accordance with an exemplary embodiment of the present invention.

The linear motor 100 can be configured as a poly-phase linear motor, wherein the stationary part 110 consists of multiple coils arranged longitudinally in a poly-phase circuit (see also FIG. 2). The moving part 120 can include magnets, such as permanent magnets, arrayed side by side, with alternating N and S poles along its traveling direction A. Alternatively, the moving part 120 can be configured as a reaction rail, for example as a simple bar of copper or aluminum without magnets, or a set of coils which are excited by direct current (DC) and create a N-S alternating magnetomotive force (MMF).

As illustrated in FIG. 1, the stationary part 110 comprises a plurality of stationary sections 112, 114, 116 arranged in a longitudinal direction, i.e. the traveling direction A, which form the stationary part 110. The stationary part 110 can comprise as many sections 112, 114, 116 as needed for a particular application of the linear motor 100. Each section 112, 114, 116 can be configured in its dimensions as needed. Typically, the sections 112, 114, 116 may comprise identical or similar dimensions, for example width and length. In an example for an application, the linear motor 100 may be used to propel vehicles or the like, wherein the stationary part 110 spans the length of a path or track that the vehicle travels. In such applications, the moving part 120 is typically mounted on the vehicle. The stationary part 110 interacts with the moving part 120 mounted on the vehicle to propel the vehicle along the track. FIG. 1 further illustrates gaps or spaces 140 between the individual stationary sections 112, 114, 116, that may be necessary for example for installing the stationary part 100 in a specific environment. Thus, depending on the application and environment, the stationary sections 112, 114, 116 can be arranged adjacent to each other without spaces or gaps.

FIG. 2 illustrates a 3-dimensional schematic diagram of a portion of a stationary section 200 of a stationary part of a linear AC motor in accordance with an exemplary embodiment of the present invention. As described with reference to FIG. 1, the stationary part 110 of the linear motor 100 can comprise multiple stationary sections 112, 114, 116, wherein FIG. 2 illustrates a portion of an example for a stationary section 200.

The illustrated portion of the stationary section 200 comprises a plurality of stator blocks 210, which form the stationary section 200. Typically, the stationary section 200 comprises a plurality of stator blocks 210, for example between 10 and 100 stator blocks 210.

Each stator block 210 comprises multiple coils 220, 230, 240, arranged in a poly-phase circuit, in particular a 3-phase circuit. Coils 220 represent phase A, coils 230 represent phase B and coils 240 represent phase C of the poly-phase system.

All coils 220, 230, 240 of one phase A, B or C of each stator block 210 are wired in series. Further, all coils 220, 230, 240 of one phase A, B or C of all stator blocks 210 and thus of one stationary section 200 are wired in series. This means that all coils 220 of phase A are wired in series, all coils 230 of phase B are wired in series, and all coils 240 of phase C are wired in series. Since the stationary sections 200 form the stationary part 110 of the linear motor 100 (see FIG. 1), all coils 220, 230, 240 of one phase A, B or C of the stationary part 110 are wired in series.

FIG. 2 further illustrates that the stator blocks 210 comprising the coils 220, 230, 240 are spatially located overlapping so that a magnetically continuous stationary section 200 is provided. Similarly, the stationary sections 200 (see 112, 114, 116 of FIG. 1) of the stationary part 110 can be spatially located overlapping so that a magnetically continuous stationary part 110 is provided. That is, if a poly-phase current of a same magnitude, frequency and phase is applied to two contiguous sections 200 (112, 114, 116), the moving magnetomotive force (MMF) generated is continuous at section interfaces 250.

With reference to FIG. 1 and FIG. 2, one or more spaces or gaps 140 between the stationary sections 112, 114, 116, may be provided in a longitudinal direction, i.e. the traveling direction A. Such spaces 140 allow for example space for wiring of the stationary sections 200 (112, 114, 116). In other configurations, the stationary sections 200, 112, 114, 116 may be arranged adjacent to each other without spaces between them.

Figure 3:
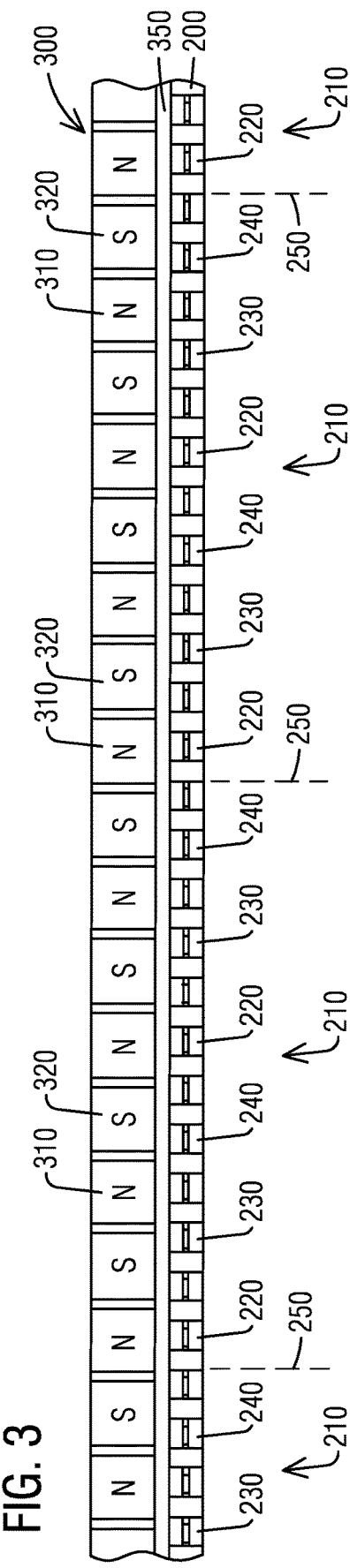
FIG. 3 illustrates a plan view of the portion of the stationary section 200 as illustrated in FIG. 2 in accordance with an exemplary embodiment of the present invention.

FIG. 3 illustrates a plan view of the portion of the stationary section 200 as illustrated in FIG. 2 in accordance with an exemplary embodiment of the present invention. As noted before, the stationary section 200 comprises the multiple blocks 210 with multiple coils 220, 230, 240 of phases A, B and C. Further, a moving part 300 is shown. The moving part 300 comprises a plurality of magnets 310, 320, such as for example permanent magnets, arrayed side by side, with alternating N and S poles along the traveling direction A. The moving part 300 with the magnets 310, 320 is arranged opposite the stationary section 200, separated by air gap 350. The moving part 300 with magnets 310, 320 can be arranged on either side of the stationary section 200 or on both sides of the stationary part 110, according to specific applications of the linear motor.

Figure 4:
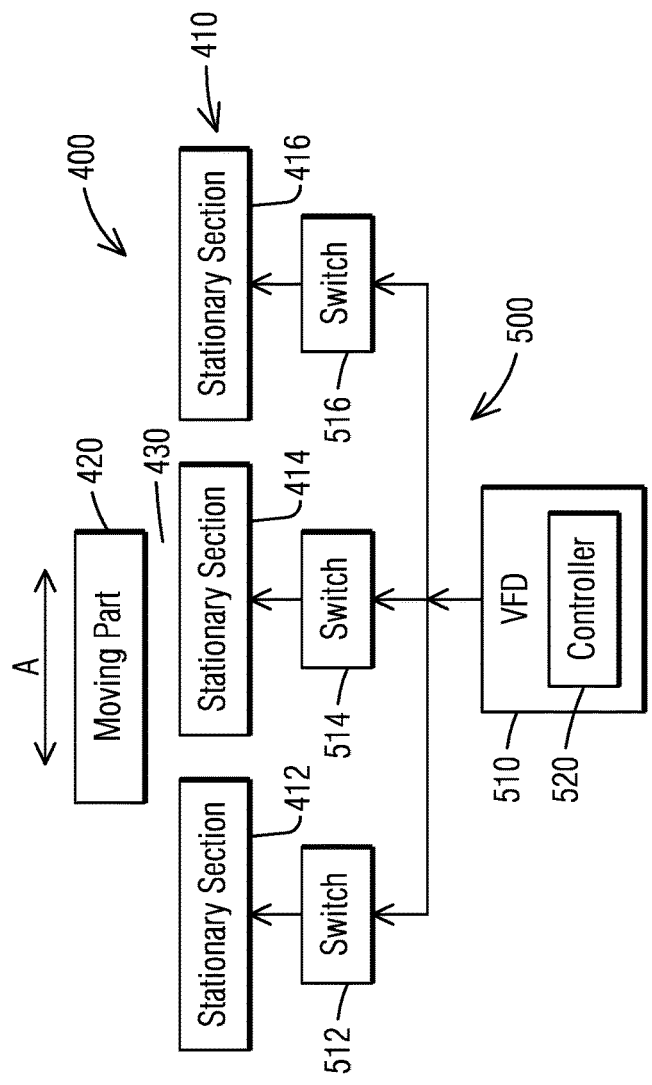
FIG. 4 illustrates a schematic diagram of a system comprising a linear alternating current (AC) motor and a variable frequency drive (VFD) in accordance with an exemplary embodiment of the present invention.

FIG. 4 illustrates a schematic diagram of a system 500 comprising a linear alternating current (AC) motor 400 and a variable frequency drive (VFD) 510 in accordance with an exemplary embodiment of the present invention.

In an exemplary embodiment, the linear AC motor 400, herein also referred to as simply linear motor 400 can be configured as poly-phase linear motor as described before with reference to FIG. 1, FIG. 2 and FIG. 3. The linear motor 400 comprises a stationary part 410 and a moving part 420, separated by an air gap 430, wherein a linear force is produced along a length of the linear motor 400, which is the traveling direction A of the moving part 420. As described before, the stationary part 410 can comprise multiple sections 412, 414, 416, each section 412, 414, 416 comprising a plurality of stationary blocks, as described for example with reference to FIG. 2, including coils for a 3-phase system.

One way of powering and controlling the coils of the stationary part 410 is by variable frequency drives (VFD). In the linear motor 400, the moving part 420 is typically shorter than the stationary part 410 since the moving part 420 moves along the stationary part 410. When the stationary part 410 comprises the coils, and the linear motor 400 is powered and controlled by VFD(s), the length of the stationary part 410 should not be made too long, because most of the coils are not coupled to the moving part 420, and the uncoupled coils create a leakage flux which the VFD has to contend with by applying more voltage than would be necessary to drive only the coils coupled to the moving part 420 of the motor 400. This phenomenon results in a poor utilization of the VFD as it must be rated for more voltage, which provides no contribution to the power delivered to the moving part 420. Thus, the stationary part 410 is divided into discrete stationary sections 412, 414, 416 which are individually powered and controlled, for example by one or more VFDs. But as the stationary part 410 becomes shorter, the more switches may be required to connect the one or more VFD(s) to the subsequent stationary sections 412, 414, 416, which may become uneconomic. In any case, a need for switching between stationary sections 412, 414, 416 arises.

One approach to maintaining excitation to the stationary part 410 over multiple sections 412, 414, 416 is to use multiple, at least two, VFDs and switch them onto the stationary sections 412, 414, 416 alternately. For example, a first VFD begins by feeding alternating current (AC) to section 412, and then as the moving part 420 passes onto section 414, a second VFD takes up by supplying AC to section 414. After section 414 is traversed, the first VFD is switched onto section 416 and provides propulsive power. But this approach requires exquisite coordination between the first and second VFDs so that the second VFD is already supplying current at the proper frequency and phase as the moving part 420 approaches a section boundary (section interfaces). The first VFD would not stop delivering current until the moving part 420 was entirely in section 414, and no loss of propulsive force across the section boundary may be achieved.

In an exemplary embodiment of the present invention and with reference to FIG. 4, the system 500 comprises a single drive, specifically a variable frequency drive (VFD) 510, to feed all the stationary sections 412, 414, 416. Specifically, the VFD 510 feeds current (AC) to one section 412, 414 or 416 at a time by switching the VFD 510 onto each section 412, 414, 416 as the moving part 420 passes (travels) between the sections 412, 414, 416. Thus, only one VFD 510 is needed, and a need to precisely synchronize more than one drive for a hand-off between sections is eliminated.

The system 500 further comprises a plurality of switches 512, 514, 516 coupled between the VFD 510 and the stationary part 410, specifically the stationary sections 412, 414, 416, wherein the plurality of switches 512, 514, 516 allow connecting or disconnecting of the VFD 510 to or from the stationary sections 412, 414, 416 as needed. Each stationary section 412, 414, 416 is individually powered and controlled by the VFD 510, wherein one switch 512, 514, 516 is coupled between each stationary section 412, 414, 416 and the VFD 510. That is, switch 512 is coupled between section 412 and VFD 510, switch 514 is coupled between section 414 and VFD 510 and switch 516 is coupled between section 416 and VFD 510.

The VFD 510 feeds alternating current to those section(s) 412, 414, 416 that are operably coupled and connected to the VFD 510 via the switches 512, 514, 516. The VFD 510 is configured to activate, i.e. trigger, and/or deactivate the plurality of switches 512, 514, 516, and comprises for example a controller 520 comprising a control system, configured as for example software and/or hardware, that allows switching between the sections 412, 414, 416 according to predefined or predetermined sequences or applications. The controller 520 can comprise further control functions for controlling operation of the VFD 510. As noted before, in an example, the VFD 510 sequentially powers and feeds AC to one section 412, 414 or 416 at a time by switching the VFD 510 onto each section 412, 414, 416 as the moving part 420 passes (travels) between the sections 412, 414, 416. In an example, the switches 512, 514, 516 are operated as the moving part 420 is about midway between sections 412, 414, 416. The switching and/or controlling of the linear motor 400 with the VFD 510 are without feedback control. The VFD 510 may be operating in an open-loop operation with a pre-programmed variable frequency (i.e. df/dt), for example chosen to reach the linear motor rated speed at a desired point of time or distance of the moving part 420, or it may be controlled closed-loop based on position pulses from a trackside encoder, or closed-loop from an internally calculated position of the stator flux based on stator voltage.

VFD 510 may be configured as described for example in U.S. Pat. No. 5,625,545 to Hammond which is incorporated herein in its entirety. For example, the controller 520 may control operation of a power circuit of the VFD 510 and may be coupled to motor voltage/current feedback lines coupled to the linear motor 400. In some embodiments, controller 520 may include a microprocessor or other suitable CPU (central processing unit) and a memory for storing software routines to determine for example motor speed and the criteria for varying the output voltage magnitude and frequency of the VFD 510. Alternatively, controller 520 may transmit feedback information to another component (not shown) and receive commands from that component regarding adjustments to the output voltage magnitude and frequency.

With further reference to FIG. 4, the plurality of switches 512, 514, 516 comprise thyristor switches. A thyristor switch is a semiconductor device that is much faster in switching than electromechanical contactors. Further, the VFD 510 is equipped with a current regulator which controls the output current of the VFD 510 during the switching. The current regulator can be incorporated for example into the controller 520 of the VFD 510. The plurality of switches 512, 514, 516 can be incorporated into the VFD 510 and can be for example located within an enclosure of the VFD 510. Alternatively, as indicated in FIG. 4, the switches 512, 514, 516 can be physically located between the VFD 510 and the sections 412, 414, 416. In this case, the switches 512, 514, 516 can be positioned in housing(s) or cabinet(s) with individual electrical connections, i.e. cables, to the VFD 510 and the sections 412, 414, 416. Multiple switches 512, 514, 516 can be arranged in one cabinet or each switch 512, 514, 516 may comprise its own cabinet.

Rather than using two or more VFDs and handing off control from one to the other, the proposed solution just uses one single VFD 510 in combination with fast switches 512, 514, 516 to connect the VFD 510 to the stationary sections 412, 414, 416 in sequence as the moving part 420 traverses the track. The VFD 510 comprises fast and accurate current regulators. Since the stator sections 412, 414, 416 are highly inductive, control of the current can be maintained. In particular, the switches 512, 514, 516 are operated as the moving part 420 is about midway between sections 412, 414, 416. The proposed solution requires only one single VFD 510, thereby reducing cost, and greatly simplifies the control by avoiding the hand-off between multiple VFDs. The single VFD 510 has a short decrease of propulsive force, for example during switching from one section to another, which does not significantly affect speed trajectory of the system 500. Although the propulsive force may decrease during transition between the sections 412, 414, 416, because the moving part 420, specifically the magnets of the moving part 420, pass out of a section 412, 414, 416 while the moving part 420 is connected and carrying current, and the magnets are not fully into a next section 412, 414, 416 when the current from the VFD 510 appears in that next section 412, 414, 416, but the interval of reduced propulsive force is very short.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

The invention claimed is:

1. A system for controlling a linear alternating current (AC) electrodynamic machine comprising:

a linear AC electrodynamic machine comprising a stationary part with a plurality of discrete stationary sections, each stationary section comprising a plurality of stator blocks, wherein each stator block comprises multiple coils arranged in a poly-phase circuit, and wherein coils of a phase are wired in series for the plurality of stator blocks;

a variable frequency drive (VFD) configured to be coupled at an input to a utility power source and to provide output currents, wherein an output of the VFD is operable coupled to the stationary part of the linear AC electrodynamic machine for powering and controlling the stationary sections of the stationary part; and a plurality of switches coupled between the VFD and the stationary part, wherein the plurality of switches allows connecting or disconnecting the VFD to or from the stationary sections, and wherein the plurality of switches comprises thyristors.

2. The system of claim 1, wherein the plurality of switches is arranged to connect or disconnect the VFD to or from each discrete stationary section.

3. The system of claim 1, wherein at least one switch of the plurality of switches is arranged between the VFD and each discrete stationary section.

4. The system of claim 1, wherein the VFD provides output alternating currents to the stationary section that is connected to the VFD.

5. The system of claim 1, the linear AC electrodynamic machine further comprising a moving part, wherein the plurality of discrete stationary sections is sequentially powered by the VFD via the plurality of switches in order to move the moving part along the stationary part.

6. The system of claim 1, wherein the VFD is adapted to trigger the plurality of switches using a controller.

7. A method for controlling a linear alternating current (AC) electrodynamic machine comprising:

sequentially powering a plurality of discrete stationary sections of a linear AC electrodynamic machine via a plurality of switches using a single variable frequency drive (VFD), wherein the plurality of switches comprises thyristors, and wherein each discreate stationary section comprises a plurality of stator blocks, wherein each stator block comprises multiple coils arranged in a poly-phase circuit, and wherein coils of a phase are wired in series for the plurality of stator blocks.

8. The method of claim 7, further comprising:

connecting the single VFD to a first stationary section via a first switch while disconnecting the single VFD from a second stationary section via a second switch.

9. The method of claim 7, the linear AC electrodynamic machine further comprising a moving part, wherein the plurality of discrete stationary sections is sequentially powered by the VFD via the plurality of switches in order to move the moving part along the stationary part.

10. The method of claim 9, wherein the plurality of switches is operated as the moving part is about midway between adjacent discrete stationary sections.

11. The method of claim 10, wherein the VFD is adapted to operate and trigger the plurality of switches using a controller.

* * * * *